3,383,424
PREPARATION OF DIOLS CONTAINING AN
ADAMANTANE NUCLEUS
Robert E. Moore, Wilmington, Del., assignor to Sun Oil
Company, Philadelphia, Pa., a corporation of New
Jersey
No Drawing. Continuation-in-part of application Ser. No.
421,614, Dec. 28, 1964. This application Aug. 30, 1967,
Ser. No. 664,311
12 Claims. (Cl. 260—617)

ABSTRACT OF THE DISCLOSURE

Preparation of 1,3-diols of adamantane or $C_{11}$—$C_{18}$ alkyladamantanes by contacting the parent hydrocarbon with an acetic acid solution of chromic acid in amount such that the Cr to hydrocarbon molar ratio is in excess of 3:1.

Cross reference to related application

This application is a continuation of application Ser. No. 421,614, filed Dec. 28, 1964, now abandoned.

Background of the invention

This invention relates to the preparation of diols from adamantane or from alkyladamantanes having from eleven to eighteen carbon atoms and at least two unsubstituted bridgehead positions. More specifically the invention involves the oxidation of these adamantane hydrocarbons by means of chromic acid under certain conditions resulting in the formation of two hydroxy groups attached to the adamantane nucleus at bridgehead positions.

The carbon nucleus of adamantane (tricyclo[3.3.1.1$^{3,7}$]decane) contains ten carbon atoms arranged in a completely symmetrical, strainless manner such that four of the carbon atoms occupy bridgehead positions in the rings. The structure of adamantane is often depicted typographically as follows:

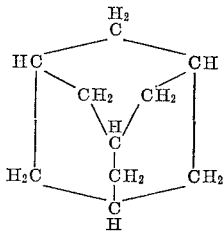

All four bridgehead carbons are equivalent to each other and likewise all rings are equivalent.

In the prior art adamantane has been reacted with chromic acid in a solution of acetic acid and acetic anhydride. The main product obtained was 1-hydroxyadamantane and no diol was detected in the oxidation product.

Description of the invention

It has now been found that diols of adamantane and $C_{11}$–$C_{18}$ alkyladamantanes can be produced by chromic acid oxidation of the hydrocarbon provided that certain conditions are used in the reaction. These conditions include the use of aqueous acetic acid as solvent for the chromic acid and the use of chromic acid in amount such that the atoms of Cr per molecule of hydrocarbon are at least 3:1 and more preferably in excess of 5:1. The aqueous acetic acid should have an acetic content or strength in the range of 70-95% by weight, more preferably 70-85%. By utilizing high ratios of Cr:hydrocarbon as above specified the diol can be formed in high yield with essentially no monool being in the reaction product.

The acetic acid content as herein expressed refers to the strength that the acetic acid would have if it and water were the only constituents present. Expressed another way, the weight ratio of acetic acid to water in the reaction mixture should be in the range of 95:5 to 70:30, and it preferably does not exceed 85:15.

In one manner of carrying out the oxidation the chromic acid solution is first prepared by dissolving chromium trioxide in the aqueous acetic acid or by dissolving it in water and then adding an amount of acetic acid to the solution to reach an acetic acid strength in the range of 70–95% by weight. The concentration of chromic acid in the solution is not critical but typically may be in the range of 20–30% by weight. The adamantane hydrocarbon is then introduced into the reagent solution in which it is essentially insoluble, and the mixture is agitated whereby an exothermic reaction occurs. The amount of hydrocarbon so added is such that the Cr:hydrocarbon molar ratio is at least 3:1 and preferably is in excess of 5:1, i.e., at least 3 and more preferably 5 atoms of chromium are present per molecule of the adamantane hydrocarbon. The reaction can be effected by agitating the mixture at any temperature in the range of 10–250° C. However the minimum molar ratio of Cr to total adamantane hydrocarbon added that is suitable for obtaining a good yield of diol varies somewhat depending upon the initial temperature at which the hydrocarbon and oxidant are contacted. More specifically the Cr:hydrocarbon molar ratios as a minimum should be approximately as follows:

(1) At least 4:1 when the initial contacting temperature is in the range of 10–40° C.
(2) At least 3.5:1 when the initial contacting temperature is in the range of 40–60° C.
(3) At least 3:1 when the initial contacting temperature is above 60° C.

Preferably the reaction is started at a temperature within the range of 60–120° C. and is held in such temperature range to obtain a relatively fast reaction rate while avoiding sludge formation which tends to occur at higher temperatures.

The oxidation reaction is exothermic, and as the reaction proceeds the mixture generally will become homogeneous. The reaction is continued until at least a major portion and preferably all of the hydrocarbon has been oxidized. This will result in the formation of two hydroxyl groups per molecule which groups will be located at bridgehead positions of the adamantane nucleus. When the Cr:hydrocarbon ratio is 5:1 or higher little if any monool will be present in the reaction product when the reaction is completed. The time of reaction of course will depend upon the particular reaction temperature selected but typically may be of the order of 2–5 hours at 75° C.

After the oxidation is complete, the reaction mixture can be chilled by means of ice and a portion of the diol product will precipitate from solution and can be separated by filtration. Neutralization of the filtrate with ammonium hydroxide will then cause most of the diol product to precipitate, and the diol thus obtained again can be separated by filtration. Some of the diol will remain in solution because of its solubility in water, and it can be recovered by letting the mixture evaporate to near dryness. In some cases the product may contain small amounts of a hydroxyketo derivative and a mono-ester of acetic acid.

The chromic acid for effecting the oxidation can also be prepared from an alkali metal dichromate, such as $Na_2Cr_2O_7$ or $K_2Cr_2O_7$, and sulfuric acid. A substantial molar excess of $H_2SO_4$ relative to the dichromate salt should be employed and preferably the molar ratio of $H_2SO_4$ to $Na_2Cr_2O_7$ (or $K_2Cr_2O_7$) should exceed 2:1. High ratios of these components tend to increase the yield of dihydroxyadamantane compound produced in the reaction.

Regardless of whether the chromic acid is formed from $CrO_3$ or from the alkali metal dichromates, the presence of acetic acid in the reaction mixture in large amount relative to the adamantane hydrocarbon is highly desirable. The molar ratio of these two components generally should be at least 10:1 and more preferably should exceed 20:1. These ratios are based upon the equivalent amount of glacial acetic acid (i.e., $CH_3COOH$). If the acetic acid is omitted from the reaction mixture, the reaction product will be predominantly the monohydroxyadamantane derivative and only small amounts (e.g., 5%) of the diol will be produced.

In some instances in practicing the invention the reaction product may comprise both the monohydroxy and dihydroxy derivatives in substantial amounts. For obtaining the 1,3-diol in high purity and high yield the product mixture can be treated with pentane, petroleum ether or anhydrous ethyl ether. Any of these solvents or equivalent solvents will selectively dissolve the monool and other oxidation products and leave the diol as residue. A suitable procedure is to mix the reaction products with boiling solvent, cool the mixture to room temperature, filter and then wash the residue with an additional amount of solvent. The filtrate generally will have a greenish color while the diol residue will be white crystals. The monool can be obtained in the form of white crystals from the filtrate by cooling the latter to dry ice temperature and filtering.

The following are some specific adamantane hydrocarbons which can be converted to diols according to the invention:

adamantane;
1-methyladamantane;
1-ethyladamantane;
1,3-dimethyladamantane;
1-methyl-3-ethyladamantane;
2-methyl-4-ethyladamantane;
1,3,6-trimethyladamantane;
1,3-dipropyladamantane;
1-hexyladamantane;
1-octyladamantane; and the like.

The following examples illustrate the invention:

Examples I–V

In order to illustrate the importance of the ratio of Cr atoms to molecules of starting hydrocarbon as herein specified, a series of runs was made in which 1,3-dimethyladamantane (DMA) was oxidized using various Cr:hydrocarbon ratios. Each run was carried out in a stirred reactor using aqueous acetic acid containing 85% by weight of acetic acid and chromium trioxide ($CrO_3$) as the source of chromic acid. In each case the reaction was started at about room temperature by adding the hydrocarbon dropwise, whereupon the temperature rose in about 15 minutes to within the range of 75–90° C. where it was maintained for about 3.3 hours. The molar ratio of acetic acid to total DMA added was about 22:1. The products were recovered from the reaction mixtures by precipitation and filtration in the manner previously described. They were analyzed by vapor phase chromatography in conjunction with infrared spectra and the results are shown in Table I.

TABLE I.—OXIDATION OF DIMETHYLADAMANTANE

| Run No | 1 | 2 | 3 | 4 | 5 |
|---|---|---|---|---|---|
| Mole Ratio of Cr: DMA | 1.5 | 3.34 | 4 | 5 | 6 |
| Product composition, wt. percent: | | | | | |
| 1-monool | 90.1 | 70.1 | 58.9 | | |
| 2-ketone | 3.4 | 4.4 | | | |
| monoacetate | 4.6 | 4.0 | | 1.0 | |
| 1,3-diol | | 6.6 | 37.8 | 95.9 | 99.3 |
| Keto-monool | 1.9 | 13.1 | 3.3 | 3.1 | 0.7 |
| Unknown | | 1.8 | | | |

From the data in Table I it can be seen that the Cr:hydrocarbon ratio used has a marked effect on the composition of the reaction product. At relatively low ratios the main reaction product is the bridgehead monoalcohol listed as 1-monool. Since the reaction was started at room temperature rather than at a higher temperature level, it was only after the Cr:DMA ratio had been increased to above 4:1 that the principal reaction product was the bridgehead diol. The data show that at ratios above 5:1 the 1,3-dihydroxydimethyladamantane is obtained in surprisingly high purity even when the reaction is started at room temperature. This diol product is a crystalline solid having a melting point of about 214–215° C.

Example VI

Another run (No. 6) was made in which 1-ethyladamantane was oxidized using a 5:1 molar ratio of Cr:hydrocarbon and a 22:1 molar ratio of acetic acid to the ethyladamantane. Again the chromic acid was derived from chromic trioxide, 85% aqueous acetic acid was used, the reaction was begun at room temperature and was allowed to rise to 75–90° C., and the temperature then was maintained in this range for about 3.3 hours. Analysis of the reaction product showed the following composition by weight:

TABLE II.—OXIDATION OF ETHYLADAMANTANES

|  | Percent |
|---|---|
| 1,3-dihydroxy-5-ethyladamantane | 97.5 |
| Ketoalcohol | 1.5 |
| Unknown | 1.0 |

After further purification of the diol by recrystallization from acetone, it was found to have a melting point of 165° C.

Examples VII–IX

Three runs were made in which the charge hydrocarbon was 1,3-dimethyladamantane (DMA) and the combination of sodium dichromate and sulfuric acid was used to form the chromic acid. In all three runs 10.0 g. (0.061 mole) of the dimethyladamantane and 36.1 g. (0.122 mole) of $Na_2Cr_2O_7 \cdot 2H_2O$ were used. This corresponded to 4.0 atoms of chromium per molecule of the hydrocarbon. In Run 7 no acetic acid was present where relatively large amounts were used in Runs 8 and 9. In each run the reaction was started at room temperature by adding the DMA dropwise whereupon the temperature rose to 75–90° C. in about 15 minutes. While the mixture was being stirred, the temperature was then maintained at this level for about 3.3 hours. The reaction products were recovered in the same manner as in the preceding examples. Analyses of the products by vapor phase chromatography gave the results shown in Table III. The chromatograph column used detected only the monoalcohol and dialcohol as reaction products, but it is probable that small amounts of other reaction products as shown in Table I were present. Table III shows the composiiton of the reaction mixtures and of the products for Runs 7–9.

TABLE III.—OXIDATION OF DIMETHYLADAMANTANE

| Run No | 7 | 8 | 9 |
|---|---|---|---|
| Reaction mixture composition, moles: | | | |
| 1,3-dimethyladamantane | 0.61 | 0.061 | 0.061 |
| Acetic acid | | 1.35 | 1.21 |
| $H_2SO_4$ | 0.71 | 0.156 | 0.306 |
| Water | 3.87 | 0.84 | 0.88 |
| $Na_2Cr_2O_7 \cdot 2H_2O$ | 0.122 | 0.122 | 0.122 |
| Weight ratio of acetic acid to water | | 84:16 | 82:18 |
| Molar ratio of acetic acid to DMA | | 22:1 | 20:1 |
| Reaction product, wt. percent: | | | |
| 1-monool | 94.3 | 68 | 30 |
| 1,3-diol | | 32 | 70 |

Comparison of Run 7 with Runs 8 and 9 shows the importance of having acetic acid in the reaction mixture in relatively large amount in order to produce the diol. When no acetic acid was used, the product was mainly the monoalcohol. A comparison of Runs 8 and 9 shows that to obtain a good yield of the diol a substantial molar excess of sulfuric acid relative to the dichromate should be employed. In Run 8 the molar ratio of these two components was 1.28 and the proportion of diol in the product was only 32%; whereas in Run 9 where the ratio was 2.5 the diol content increased to 70%. To obtain a still better yield of diol, the amounts of the dichromate and sulfuric acid relative to the hydrocarbon should be increased.

Examples X–XIII

Four more runs were made for oxidizing 1,3-dimethyl-adamantane (DMA) in generally the same manner as in Examples I–V using $CrO_3$ as the source of chromic acid. However, in these runs the aqueous acetic acid solution of chromic acid was heated to 75–90° C. and then the addition of DMA was begun while the mixture was being stirred. The time of addition of the DMA was about 45 minutes and the reaction time from the start of such addition was about 3.5 hours. The Cr:DMA ratios were as listed in Table IV and otherwise the conditions were as described for Examples I–V. Results from vapor phase chromatography are given in Table IV.

TABLE IV.—OXIDATION OF DIMETHYLADAMANTANE

| Run No | 10 | 11 | 12 | 13 |
|---|---|---|---|---|
| Ratio of Cr:DMA | 2 | 3 | 4 | 5 |
| Product composition, wt. percent: | | | | |
| 1-monool | 74.0 | 41.8 | 13.1 | 1.4 |
| 2-ketone | 0.9 | 2.0 | | |
| 1,3-diol | 23.6 | 53.6 | 86.9 | 96.5 |
| Keto-monool | 1.5 | 2.6 | | 2.1 |

A comparison of these results with those of Table I shows the effect of starting the reaction at elevated temperature instead of at room temperature. As can be seen from Table IV, when the chromic acid solution was heated to 75–90° C. before addition of the hydrocarbon, a Cr:DMA ratio of 3:1 was sufficient to result in formation of the diol as the major product. On the other hand as shown in Table I, when the hydrocarbon was first added at room temperature and the temperature was subsequently maintained at 75–90° C. after it had risen to that level, even a Cr:DMA ratio of 4:1 was not quite sufficient to cause the diol to be the major product although it was produced in substantial yield. Both tables show that Cr:hydrocarbon molar ratios above 5:1 are preferable for producing the 1,3-diol in high purity.

When adamantane or any $C_{11}$–$C_{18}$ alkyladamantane having at least two unsubstituted bridgehead positions is substituted for the hydrocarbons used in the foregoing examples, substantially similar results are obtained. When the reaction is attempted omitting the acetic acid and using only an aqueous solution of chromic acid, no reaction occurs.

The 1,3-diols prepared in accordance with the invention are useful as intermediates in the preparation of special lubricants and polymers. For example, the diols can be reacted with aliphatic monocarboxylic acids (e.g., pelargonic acid) to produce ester lubricants as described in application Ser. No. 531,059, filed Mar. 2, 1966. Also they can be interacted with various diacids, anhydrides or diacid chlorides to yield high molecular weight polyesters as disclosed in application Ser. No. 586,825, filed Oct. 14, 1966, or with dinitriles to form high molecular weight polyamides as described in application Ser. No. 542,229, filed Apr. 13, 1966.

I claim:
1. Method of forming a diol having an adamantane nucleus which comprises contacting chromic acid in an aqueous solution of acetic acid having an acetic acid strength in the range of 70–95% at a temperature in the range of 10–250° C. with an adamantane hydrocarbon selected from the group consisting of adamantane and alkyladamantanes having 11–18 carbon atoms and at least two unsubstituted bridgehead positions, the Cr:hydrocarbon molar ratio being at least 4:1 when the initial contacting temperature is in the range of 10–40° C., at least 3.5:1 when it is the range of 40–60° C. and at least 3:1 when it is above 60° C., whereby an exothermic oxidation reaction occurs, continuing the reaction until at least a major portion of said hydrocarbon has reacted, and recovering from the reaction mixture an adamantane diol having the hydroxyl substituents at bridgehead positions.

2. Method according to claim 1 wherein said temperature is in the range of 60–120° C.

3. Method according to claim 2 wherein the strength of said aqueous solution of acetic acid is 70–85%.

4. Method according to claim 1 wherein said hydrocarbon is 1,3-dimethyladamantane.

5. Method according to claim 1 wherein said hydrocarbon is 1-ethyladamantane.

6. Method according to claim 1 wherein the Cr:hydrocarbon molar ratio is at least 5:1.

7. Method according to claim 6 wherein the molar ratio of acetic acid to said adamantane hydrocarbon is in excess of 15:1.

8. Method according to claim 1 wherein the molar ratio of acetic acid to said adamantane hydrocarbon is at least 10:1.

9. Method of forming a diol of an adamantane hydrocarbon selected from the group consisting of adamantane and alkyladamantanes having 11–18 carbon atoms and at least two unsubstituted bridgehead positions which comprises forming a mixture of chromic acid in aqueous acetic acid having an acetic acid strength in the range of 70–95%, maintaining said mixture at a temperature in the range of 60–120° C. while adding thereto and mixing therewith an amount of said adamantane hydrocarbon such that the molar ratio of Cr to total added adamantane hydrocarbon is in excess of 3:1, whereby an exothermic oxidation reaction occurs, continuing the reaction until at least a major portion of said hydrocarbon has reacted, and recovering from the reaction mixture an adamantane diol having the hydroxyl substituents at bridgehead positions.

10. Method according to claim 9 wherein said molar ratio is in excess of 5:1.

11. Method according to claim 10 wherein the molar ratio of acetic acid to said adamantane hydrocarbon is in excess of 15:1.

12. Method according to claim 9 wherein the molar ratio of acetic acid to said adamantane hydrocarbon is at least 10:1.

References Cited

Schleyer et al.: "J. Am. Chem. Soc.," vol. 83, pp. 182–7 (1961).

Stetter et al.: "Chem. Abstracts," vol. 54, p. 20,912e (1960).

BERNARD HELFIN, *Acting Primary Examiner.*

T. G. DILLAHUNTY, *Assistant Examiner.*